United States Patent [19]

Chapman et al.

[11] Patent Number: 4,762,088
[45] Date of Patent: Aug. 9, 1988

[54] RELEASE MECHANISM FOR ANIMAL TELEMETRY AND DATA ACQUISITION DEVICES

[75] Inventors: Richard C. Chapman; Michael E. Hamerly, both of Brooklyn Park, Minn.

[73] Assignee: CompuCap, Inc., Brooklyn Park, Minn.

[21] Appl. No.: 80,771

[22] Filed: Aug. 3, 1987

Related U.S. Application Data

[63] Continuation-in-part of Ser. No. 897,129, Aug. 15, 1986, abandoned.

[51] Int. Cl.$^4$ ............................................. A01K 1/06
[52] U.S. Cl. .................................... 119/106; 119/29; 24/603
[58] Field of Search ............. 119/106, 110, 114, 29; 24/602, 603; 114/210, 217; 49/141

[56] References Cited

U.S. PATENT DOCUMENTS

| | | | |
|---|---|---|---|
| 3,589,341 | 6/1971 | Krebs | 119/106 |
| 3,608,160 | 9/1971 | Coyle | 24/603 |
| 4,086,685 | 5/1978 | Gaylord | 24/603 X |
| 4,399,432 | 8/1983 | Lunn | 119/29 X |
| 4,652,261 | 3/1987 | Mech et al. | 119/106 X |

FOREIGN PATENT DOCUMENTS 481278 11/1975 U.S.S.R. ............................. 119/106

Primary Examiner—Carl D. Friedman
Assistant Examiner—Richard E. Chilcot, Jr.
Attorney, Agent, or Firm—Kinney & Lange

[57] ABSTRACT

A pyrotechnic release mechanism is actuated by an electrical signal from a remote telemetry actuator such as a radio transmitter to cause two normally connected parts to separate. When used as shown with an animal collar mounted data acquisition system, the two parts can be separated to release the collar. If desired, a separate data storage device can be released to permit stored data to be recovered. The device comprises two parts with interfitting members normally held in position with a coupling pin. A pyrotechnic device is positioned behind the pin, and upon firing, the pin is moved sufficiently to clear one of the members at least, so that the two members will then separate. The device can be used to permit remotely controlled recovery of a part that is normally mounted together and which are to be separated. The movement of the separating pin after actuation can also be used for energizing a transmitter or signaling circuit that will send out a locator signal to simplify retrieval of the parts to be recovered. The linear actuation of the separating pin ensures simplicity of operation and reliability.

11 Claims, 3 Drawing Sheets

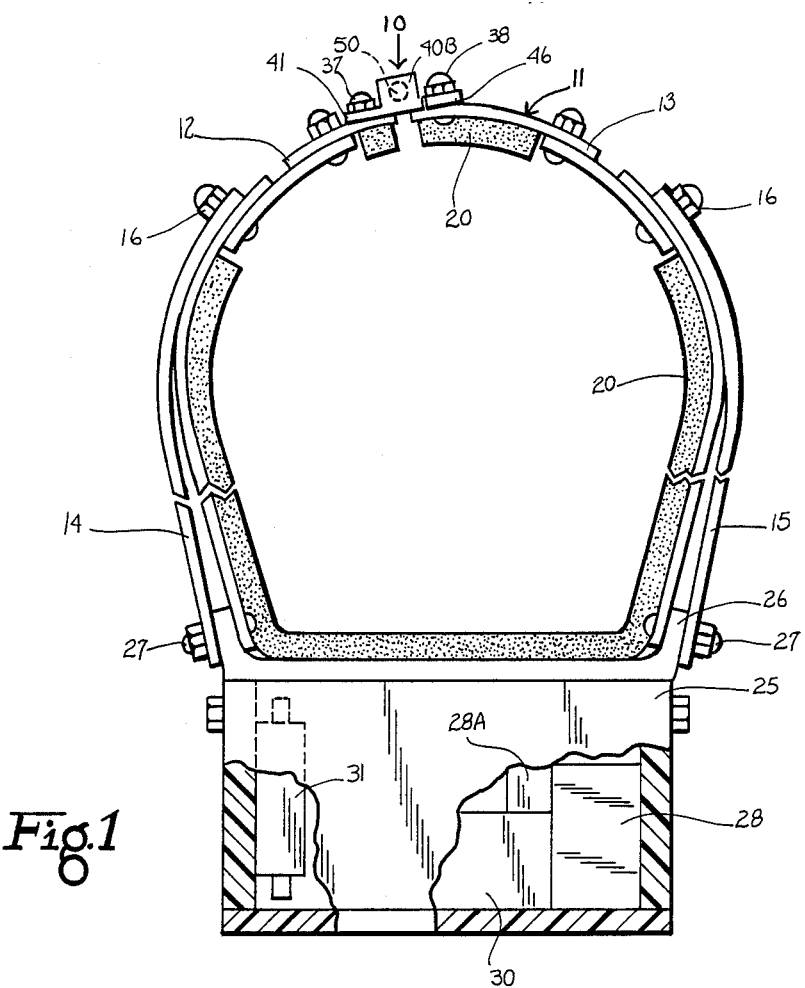
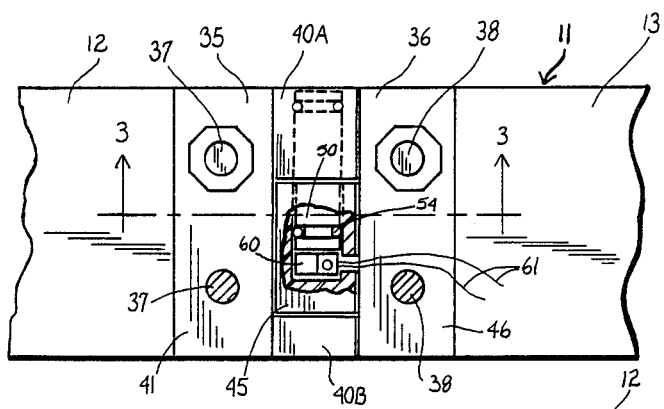
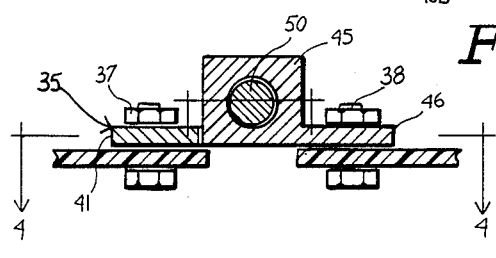
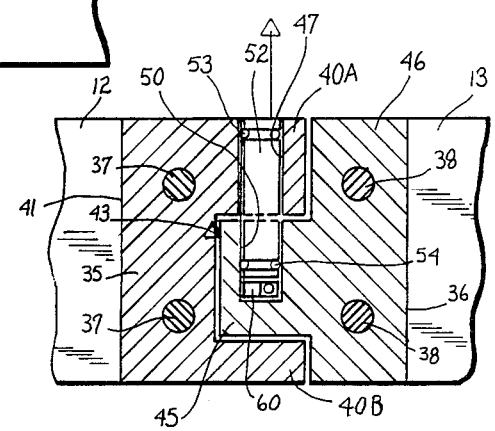

RELEASE MECHANISM FOR ANIMAL TELEMETRY AND DATA ACQUISITION DEVICES

CROSS-REFERENCE TO RELATED APPLICATION

This application is a continuation-in-part of my co-pending U.S. patent application Ser. No. 897,129, filed Aug. 15, 1986 for RELEASE MECHANISM FOR ANIMAL TELEMETRY AND DATA ACQUISITION DEVICES, now abandoned.

BACKGROUND OF THE INVENTION

1. Field of the Invention.

The present invention relates to release mechanisms for permitting two parts to be separated by remote actuation.

2. Description of the Prior Art.

In the prior art explosive or pyrotechnic separation devices have been used, for example with aircraft hatches, plungers for severing freight parachute lines and the like. In the field of data acquisition, particularly in connection with collecting data from wild animals, it has been long desirable to recover collars or harnesses used on the animals without physically restraining or drug immobilizing the animal in order to collect stored data. If the collar can be separated or opened remotely the collar can drop off and data that has been recorded and collected on digital memory carried on the collar can be recovered and analyzed.

SUMMARY OF THE INVENTION

The present invention relates to a remotely actuated release mechanism for permitting two parts of an assembly to be remotely separated. As shown, the mechanism forms two segments that can be separated upon actuation of a pyrotechnic powder. In one form, an animal collar is held together by the release mechanism and the mechanism can be separated so that equipment carrying data can be recovered. Alternately, the release mechanism may have one portion that is coupled directly to a package containing memory or other data acquisition components and when the separation device of the release mechanism is remotely actuated, the one portion will fall free while the other portion will remain in place, for example, on the animal collar. Other information gathering packages on the collar then may continue to operate for further analysis or study.

The separation device comprises a hinge-like assembly that has two parts with interfitting lugs, and a pin that passes across the interfaces between the lugs on the two parts. The pin is slid in bores in the two parts and is sealed for gas pressure so that a squib or pyrotechnic ignition detonating device can be placed behind one end of the pin along with a suitable gas generating pyrotechnic powder material. Upon actuation of the squib by an electrical signal the powder will burn to generate a gas pressure and propel the pin outwardly from its bore. The two parts are permitted to separate.

When the two parts are placed on adjacent strap sections of an animal collar or harness to normally hold the strap sections together, release will permit the collar or harness to open and drop off along with the data acquisition package that may be attached to the strap.

If one of the separable parts is coupled directly to a separate package, then the separate package will be dropped and will be retrievable without having to capture the animal, or if the separation device is mounted on another movable object, separation will permit recovering parts of interest without having to recover the object.

The release mechanism is easy to make, low in cost, and very reliable. A modification of the device permits separation of the two parts without losing the connecting pin so that the pin used for forming the coupling can be reused. Additionally, the pin that is actuated can be used for actuating other members such as pulling out an antenna of a locator beacon, or actuating a switch to turn a locator beacon so that the separated part can be located through radio signals after it has been dropped in place.

BRIEF DESCRIPTION OF THE DRAWINGS

FIG. 1 is a partial schematic front elevational view of a typical animal collar using a release mechanism or separation device made according to the present invention;

FIG. 2 is a top plan view of the separation device in FIG. 1;

FIG. 3 is a sectional view taken as on line 3—3 in FIG. 2;

FIG. 4 is a sectional view taken as on line 4—4 in FIG. 3;

DETAILED DESCRIPTION OF THE PREFERRED EMBODIMENTS

Figure 5:
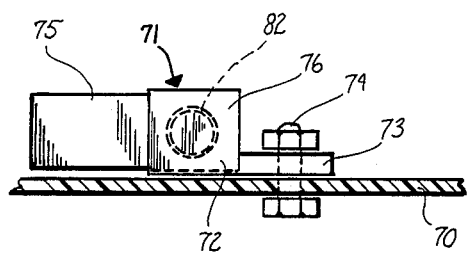
FIG. 5 is a front elevational view of a modified form of the invention showing a separating device that has a package portion that will be released from the other portion when the device is actuated.

A release mechanism or separation device made according to the present invention indicated generally at 10 is shown mounted onto a collar assembly 11 that is made for fitting onto the neck of an animal (not shown). The collar assembly is made up of several strap sections including upper strap sections 12 and 13, and lower strap sections 14 and 15 which are connected to the strap sections 12 and 13 with suitable fasteners 16. The interior of the collar 11 can be lined with suitable soft foam rubber shown at 20, and as can be seen the collar assembly 11 can be irregularly shaped, but generally forms an enclosure that will fit over the neck of an animal.

The strap sections that are joined together also could be part of a harness used for mounting equipment on an animal.

The strap sections 14 and 15 are used for mounting a data acquisition module and power pack housing indicated generally at 25 which has ears 26 that are supported on the strap sections 14 and 15 through suitable fasteners 27.

The interior of the housing 25 contains components indicated at 28 which can include power sources such as batteries, and telemetering equipment comprising a transmitter, a receiver, and other sensors and digital memory for data acquisition and storage. The components 28 can include a digital memory 30, for example, that would provide input data from an animal activity sensor of some type so that it can measure the distance that the animal may have traveled. A magnet based activity sensor shown generally at 31 may be used. Such activity sensor is more completely described in our copending application Ser. No. 897127, filed on even date herewith and entitled Magnet Based Animal Activity Sensor.

Telemetry devices which may be mounted on the collar are shown in the copending U.S. patent application of L. David Mech et al., Ser. No. 623,389, filed June 22, 1984, For Drug Injection Animal Capture Collar. The collar disclosed in that U.S. patent application included injection darts that could be remotely actuated to plunge needles in the neck muscles of animals to tranquilize them for recapture. The release mechanism shown of the present invention can provide a back-up device for recovering the collar if the drugs from the darts were ineffective.

When the data acquisition device or collar is to be recovered, for example with data in the memory indicated at 30, the separation device 10 of the present invention can be actuated by remote signals that can be transmitted by a remote transmitter to a radio signal receiver 28A comprising one of the components 28 in the housing 25. The receiver 28A may be connected to provide an electrical firing signal to the separation device through suitable leads running along the collar straps.

A first form of the release mechanism or separation device is shown in more detail in FIGS. 2, 3 and 4. The separation device 10 includes first and second portions, 35 and 36, respectively. The first portion 35 is mounted with suitable fasteners 37 to the collar strap 12, and as shown is positioned on top of the collar strap. The second portion 36 is mounted with suitable fasteners 38 to the collar strap 13.

The first portion 35 has a pair of spaced apart, aligned lugs 40A and 40B at opposite ends thereof. The lugs 40A and 40B are integral with and at one edge of a fastening plate 41 through which the fasteners 37 pass. The spacing of the lugs 40A and 40B leaves a space 43 between them, and the second fastener member 36 as shown has a single lug 45 which interfits between the lugs 40A, 40B in the space 43. The lug 45 is carried on a mounting plate 46 of the second portion which is connected to the collar strap 13 with fasteners 38.

The first lug 40A has a bore 47 therein, see FIG. 4, the bore 47 aligns with a blind bore 50 that is formed in the lug 45 coupled to the second fastener member 36. The bore 50 is made so that when the lugs 45 and 40A and 40B are interfitting, the bore 50 will align with the bore 47, and a pin 52 is inserted through both bores to hold the two lugs 40A and 45 in a fixed position relative to each other. The lugs 40A and 45 will be permitted to hinge about the axis of the pin 52. As can be seen, the pin 52 has suitable O rings 53 and 54 thereon. The O ring 53 seals in the bore 47, and the O ring 54 seals within the bore 50.

A squib indicated generally at 60 is provided in the closed end portion of bore 50 and a filling of suitable pyrotechnic powder is also provided. The squib has suitable leads 61 extending therefrom. An electrical signal along leads 61 will cause an ignition of the squib and burning of the pyrotechnic powder generates a gas pressure which will propel the pin 52 outwardly from the bore 50 with sufficient force to clear the bore 50. Once the pin clears the bore 50, it is then no longer connected to the lug 45 and the lugs 45, and 40A and 40B will separate. This will permit the collar straps sections 12 and 13 to separate. The data acquisition equipment in the housing 25 will drop off an animal wearing the collar 11 so that it can be retrieved. The pack 25 can have a locator beacon signal transmitted from it, so that people having receivers turned to a set frequency can find the dropped package. The collars are used for providing signals for locating animals, and following animals, so a transmitter in the pack 25 is usual for tracking an animal wearing the collar.

Figure 6:
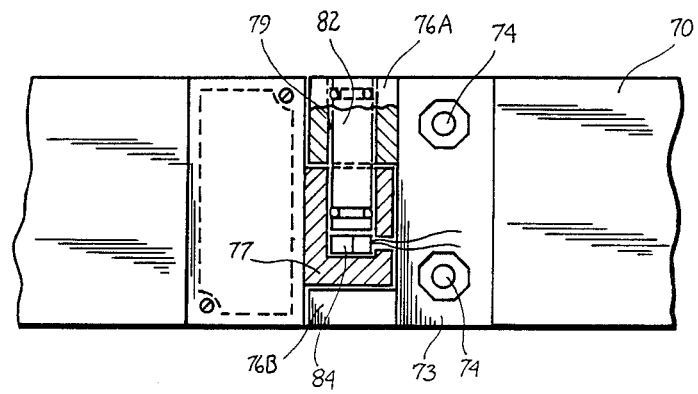
FIG. 6 is a top plan view of the device of FIG. 5 with parts broken away.
Figure 7:
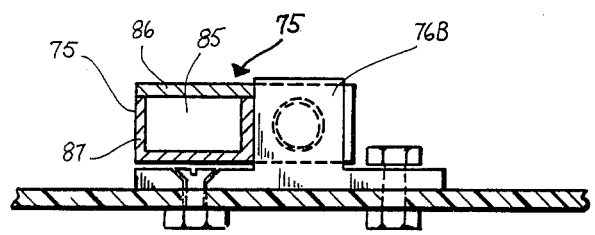
FIG. 7 is an end view of the device of FIG. 6 with parts in section and parts broken away.

FIGS. 5, 6 and 7 illustrate a modified form of the invention wherein a collar or harness strap 70 can be fastened onto an animal in any desired way, or the strap 70 could be an attachment strap coupled to other objects or equipment. In this form of the invention, a separation device indicated at 71 has a base member 72 with a plate 73 thereon, and in this form of the invention, the plate 73 is fastened to the collar strap 70 with suitable fasteners 74. A separating portion 75, in this form of the invention is fastened to the base portion 72 and not to any fixed object. An object or part that is to be retrieved may be attached to portion 72, however. The first or base portion 72 has a pair of lugs 76A and 76B which are spaced apart, and the separating portion 75 has a lug 77 that fits between the lug portions 76A and 76B. In this form of the invention, the lug 76A has a bore shown at 79, and an aligning bore 81 is provided in the lug 77. A pin 82 has suitable O rings at its opposite ends, as can be seen, and these O rings seal in their respective bores 79 and 81. A squib shown generally in dotted lines at 84 is provided to provide ignition of a pyrotechnic powder also in the package with the squib to propel the pin 82 outwardly and to permit the separable portion 75 to fall off the collar strap 70 (or other support), as it is released from the base member 72.

As can be seen in FIG. 7, separable portion 75 can be made to have an interior chamber 85, and can be made in cover and bottom sections 86 and 87 that can be fastened together in a suitable manner. The chamber 85 may house a memory chip with a small power source, so that the memory can be used to store data collected by sensors and when it is desired to analyze the data, the separable part 75 can be released from the base 72 by actuating the squib 84 to ignite the pyrotechnic powder and forcing the pin 82 out.

The separating part 75 can also have a small transmitter in it to provide a signal so that it can be found, or can be provided with other identifying indicia.

In this way an entirely self contained separable member can be separated from a data acquisition collar of an animal or other object.

Figure 8:
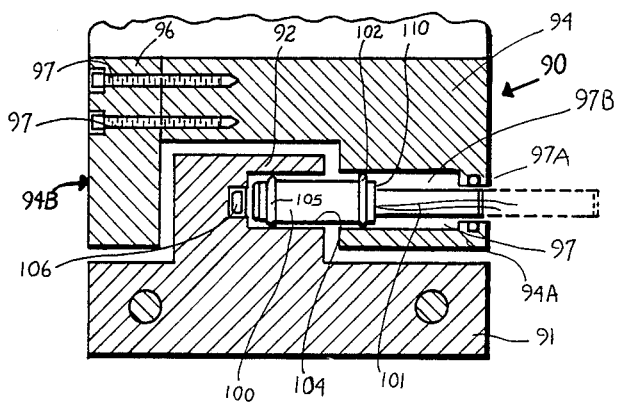
FIG. 8 is a sectional view of a modified form of the invention where a separation pin used is retained after operation and can be reused.

FIG. 8 shows a further modified form of the invention which permits the reusing of the release pin, and as shown, the separating device indicated at 90 has a first portion 91 that can have a fastener plate for fastening the portion to a strap of a collar or harness as shown in the previous forms of the invention. The first portion of the separating device has a lug 92 thereon. A second portion 94 of the separating device has a pair of spaced lugs 94A and 94B that extend from the base. The lug 94B is part of a removable member 96 that is held onto the rest of separable portion 94 with suitable cap screws 97. As can be seen, the removable member 96 is needed so that the parts can be assembled.

A bore 97 is provided in the lug 94A and is a two step bore, having a small diameter portion 97A and a large diameter portion 97B that is at the end adjacent lug 92.

A pin 100 is slidably mounted in the bore portion 97B, and has a small diameter neck portion 101 that slides in the bore 97A. A suitable O ring 102 is provided on the pin portion within the bore 97B. The outer end of pin 100 opposite from neck 101 fits within a bore 104 in the lug 92, and has an ring 105 that is sealed on the interior of the bore 104. A suitable squib detonator and pyrotechnic powder package indicated at 106 is provided in a small inner end portion of the bore 104.

In this form of the invention, when the pin 100 is propelled outwardly by pyrotechnic action, the pin portion 101 moves through bore portion 97A and a shoulder 110 engages the inner shoulder between bore portions 97A and 97B. Shoulder 110 is formed where the larger pin portion 100 meets the smaller pin neck portion 101. The engaging shoulders act as a stop and prevent the pin 100 from being expelled from the bore. However, the pin 100 is selected in length so that the end that is initially in the bore 104 will be completely clear of the lug 92 after actuation, and the separable member 91 is then free to permit one of the parts to drop away from another.

Because the pin 100 is captured, it will remain in place in the lug 94A and can be reused merely by pushing the small diameter neck 101 back into bore 104 of lug 92 on a new separable portion when the parts are put back together. Of course, the squib and pyrotechnic powder 106 would have to be reloaded for new operation.

Figure 9:
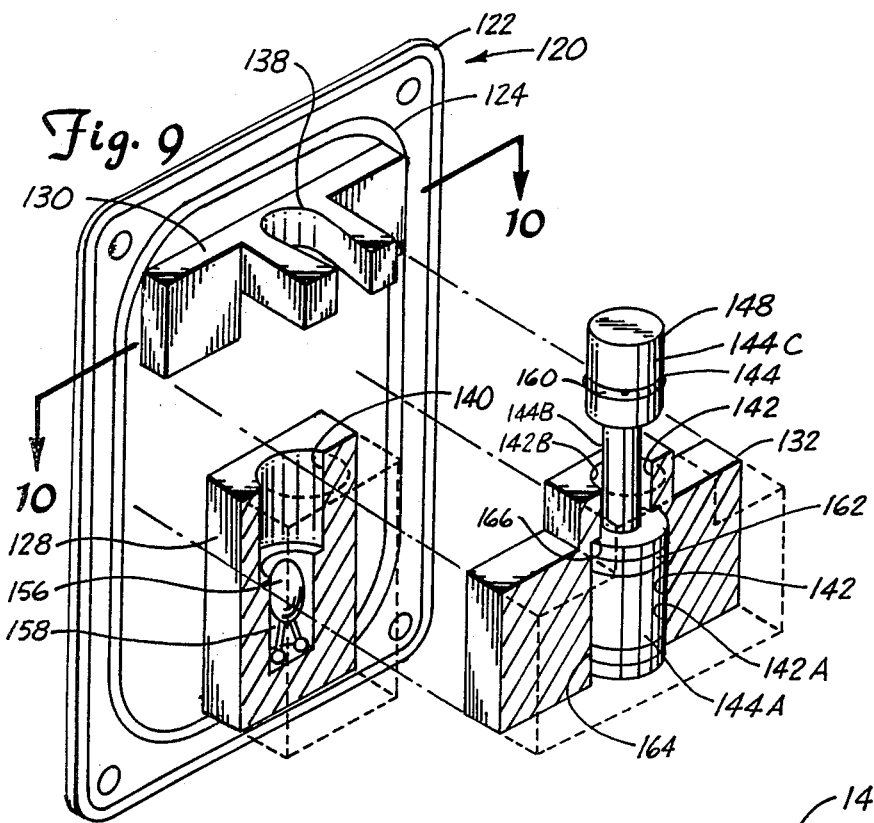
FIG. 9 is an exploded view of a second modified form of the invention wherein the separating pin is retained and can be reused.
Figure 10:
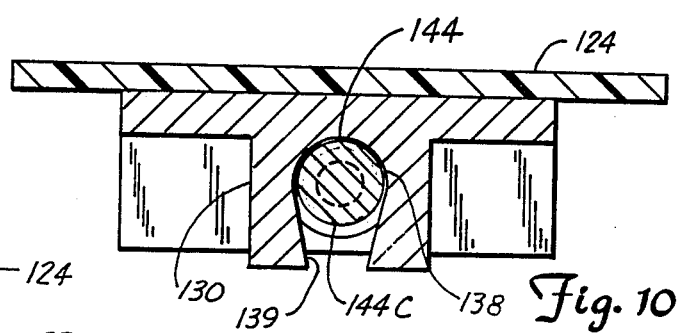
FIG. 10 is a sectional view of the device of FIG. 9 taken at line 10—10 of FIG. 9.
Figure 11:
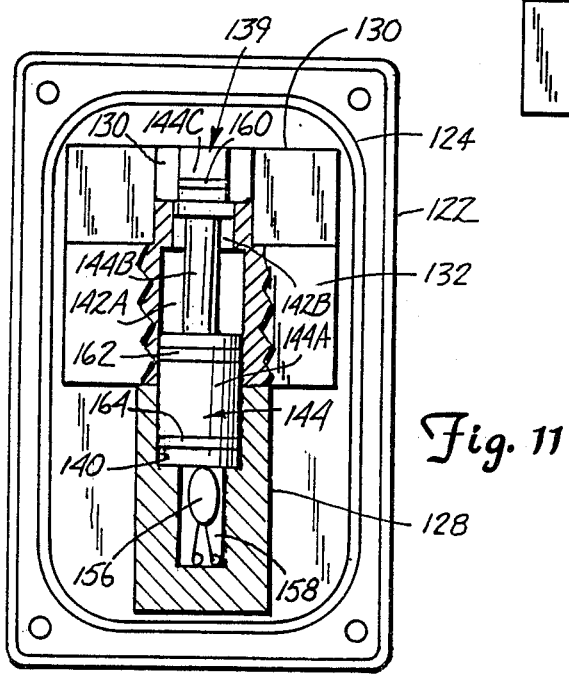
FIG. 11 is a top plan view of the device of FIG. 9 with parts broken away.

FIGS. 9, 10, and 11 show another modified form of the invention which permits reusing of the release pin. As shown a separating device indicated at 120 has a first base portion 122 that may have a fastener plate 124 for fastening the base portion 122 to a strap of a collar or harness (shown in previous forms of the invention). The base portion 122 of the separating device 120 has housing lugs 128 and 130 thereon. A second separate housing portion or leg 132 fits on the base 122 between lugs 128 and 130 (See FIG. 11). Lug 130 of the base 122 has a through bore 138. The through bore 138 has an open side forming a release opening 139 as shown in FIG. 10. The side surfaces defining the opening 139 taper and narrow from the bore 138 to the exterior as seen in FIG. 10. The second housing portion 132 has a two-step bore 142 defined therein. The pin 144 has a first large diameter piston portion 144A slidably mounted in the large diameter portion 142A of the two-step bore 142 and a second large diameter retainer portion 144C mounted in the through bore 138 of lug 130. The large diameter portions 144A and 144C are connected by a small diameter shank 144B. The pin 144 has suitable O ring seals 160, 162 and 164 on the large diameter pin portions, as in other forms of the invention. The shank 144B of the pin is mounted to pass through the small diameter portion 142B of the two-step bore 142. The lug 128 has a bore 140 defined therein one end of which axially aligns with and opens to the bore portion 142A in housing portion 132 when the lug 132 and housing portion 132 are mounted on the base. The large diameter piston portion 144A will slidably fit into bore 140 and is of length to be positioned partially within bore 140 and partially within bore portion 142A. A pyrotechnic device 156 having leads extending therefrom for receiving a remote detonating signal is located in a small end portion 158 of the bore 140. The remote end of bore portion 158 is closed.

The device 120 is assembled with the lugs 128 and 130 on the base 122 and the squib 156 is placed in the small diameter portion of bore 140. The pin 144 is placed in bore 142. The second large diameter retainer portion 144C will slide through bore portion 142B. The large diameter piston portion 144A is seated completely within bore portion 142A. The second housing portion or lug 132 then can be moved into position between the lugs 128 and 130 to align the bores 138, 140 and 142. The shank 142A will slip through opening 139 to permit the second housing portion to fully seat.

The pin 144 is then pushed so the large diameter piston portion 144A is partially in bore 140 and partially in bore portion 142A, and second large diameter portion 144C of pin 144 is in bore 138 to lock the second housing portion 132 in the assembly.

In this form of the invention, when the squib is detonated the pin 144 is propelled outwardly by the pyrotechnic action until the first large diameter portion 144A of the pin 144 strikes the shoulder 166 formed between the large diameter bore portion 142A and the small diameter bore portion 142B of the bore 142. The first large diameter piston portion 144A of the pin is then moved out and clears the bore 140 of lug 128. The second large diameter portion 144C of the pin is moved out to clear the through bore 138 of the lug 130 so that the small diameter neck portion 144B of the pin is aligned with the opening 139 of the through bore 138. The small diameter neck portion 144B of the pin 144 may then pass out the opening 139 of the through bore 138 and the first base portion 122 and the second housing portion or lug 132 may separate. The pin 144 is retained in the two-step bore 142 and may be used again to attach to another collar assembly or mounting plate.

The "squibs" are known devices that are available commercially, and serve to detonate pyrotechnic powder using a suitable electrical signal. Pyrotechnic powders are also commercially available and boron potassium nitrate ($BKNO_3$) has been found to be suitable.

The separation devices shown are easily manufactured, relatively low cost, and substantially fool proof in operation. They can be made of any of a number of types of material including metal or plastics.

The release mechanism is driven by microcomputer electronics and programming from components in housing 25A or separate controls. Triggering is accomplished by a radio signal or, if desired, automatically after a pre-programmed interval, or following some critical event such as premature loss of battery voltage.

The release mechanism is useful in a number of situations. In the case of recapture collars such as those disclosed in the Mech et al. U.S. Pat. No. 4,652,261, the release mechanism is useful for recovery of the collar if the recapture is unsuccessful. It also will permit removing recapture dart needles in the animal's neck muscles when the collar falls free. The recapture collar controls may be programmed to trigger the release mechanism 1–6 hours after the recapture attempt using the drug darts as a back-up for recapturing the data. In the case of data acquisition in the collar (i.e., storage of acquired data in semiconductor RAM or EEPROM, etc. memories or cassette tape, attached to or part of the collar or harness) the collar can be automatically released after a specific time interval, in response to a specific event, or upon receipt of a triggering radio signal. The collar or harness can then be retrieved and the data read out of the memories by appropriate techniques. In the case of data acquisition or specialized sensing, one or several data-acquisition packages made as shown in FIGS. 5–7, for example, can be attached to a collar or harness and released serially over time from the collar or harness. Upon release from the collar or harness, each data-acquisition package may be programmed to begin triggering its own radio-transmitter location beeper or beacon for ease of retrieval. In the case of data-acquisition packages, each package would have its own controlling electronics, and each package could be independently triggerable by radio-signal, or in response to events critical to its own integrity.

Although the present invention has been described with reference to preferred embodiments, workers skilled in the art will recognize that changes may be made in form and detail without departing from the spirit and scope of the invention.

What is claimed is:

1. For use in combination with an animal supported retrievable telemetry package held on the animal with strap segments and having means for initiating various actions, the improvement comprising:
   an actuable separation device for holding the strap segments together and for separating in response to the action initiating means to permit the strap segments to also separate comprising first and second members; a first member being attachable to a first strap segment, and a second member being attached to a second strap segment;
   each of the members having complementary interfitting lugs that overlap each other, each of the overlapping lugs having a bore aligning with a bore in another interfitting lug;
   a pin mounted in one of the bores and extending into the bore of an adjacent interfitting lug, the pin being movable in the other bore a sufficient distance to move to a position completely out of the one bore, thereby removing any connection between the two lugs; and
   a pyrotechnic device capable of generating a propelling gas positioned in the one bore on an end of the pin opposite from the other bore, the pyrotechnic device including means for detonating the pyrotechnic device with a remote signal, so that upon actuation the pin will be propelled to move the sufficient distance.

2. The apparatus of claim 1 wherein the one bore has one closed end at the end of the bore opposite from the other bore.

3. The apparatus as specified in claim 2 wherein the other bore has two different diameters, a bore portion having a first diameter receiving a major part of the pin and being adjacent the one bore, and a smaller diameter bore potion extending through the lug having the other bore, the pin having a small diameter neck portion extending through the small diameter bore and a large diameter portion extending into the one bore and also into the large diameter portion of the other bore a distance selected so that upon actuation of the pyrotechnic device the pin will move to a position where it is stopped against the surfaces defining the smaller bore and clears the one bore.

4. The apparatus as specified in claim 2 wherein the other bore is a through bore extending through its respective lug, the pin being completely expelled from the one bore upon actuation of the pyrotechnic device.

5. For use in combination with an animal supported retrievable telemetry package held on the animal with strap segments and having means for initiating various actions, the improvement comprising:
   an actuable separation device for holding the strap segments together and for separating in response to the action initiating means to permit the strap segments to also separate comprising first and second members;
   the first member being attachable to a first strap segment, and the second member being attached to a second strap segment;
   the first member having first and second aligned lugs, the second member having an interfitting lug adjacent to and fitting between the first and second lugs of the first member, the first and second lugs having first and second bores and the interfitting lug having a third bore aligning with the first and second bores;
   a pin mounted in the third bore and being of length to extend into both the aligning first and second bores of the first and second lugs in a first position, the pin having a first large diameter portion, a small diameter shank portion and a second large diameter potion extending from an opposite end of the small diameter portion from the first large diameter portion, the first large diameter portion being partially in the first bore and partially in the third bore between the first and second lugs; and
   a pyrotechnic device capable of generating a propelling gas and positioned in the first bore on an end of the pin opposite from the third bore, the pyrotechnic device including means for detonating the pyrotechnic device with a remote signal, so that upon actuation the pin will be propelled to move a sufficient distance to separate the lugs.

6. The apparatus of claim 5 wherein the first bore has one closed end at the end of the bore opposite from the third bore.

7. The apparatus in claim 5 wherein the third bore in the interfitting lug is a two-step bore, having two different diameters, a large diameter portion receiving the first large diameter portion of the pin and a small diameter portion receiving the small diameter portion of the pin, the first large diameter portion of the pin being partially in the large diameter portion of the two-step bore and partially in the one bore adjacent the pyrotechnic device, the pin small diameter portion being positioned in the small diameter portion of the two-step bore, the second large diameter portion of the pin being positioned in the second bore, the second lug having a length and the second bore extending the length of the second lug to form a through bore, the sides of the second bore tapering from a large diameter of size to receive the second large diameter portion of the pin to form an opening from the second bore extending the length of the second bore, the opening having a width which retains the second large diameter portion of the pin, but allows the small diameter portion of the pin to pass through the opening when the pin has been moved by the pyrotechnic device to position wherein the first large diameter portion of the pin clears the first bore and the small diameter portion of the pin aligns with the opening of the second bore, the small diameter portion of the pin passing through the opening of the second bore as the lugs separate.

8. For use in combination with an animal supported retrievable telemetry package held on the animal with strap segments and a base portion and having means for initiating various actions, the improvement comprising:

a remotely actuable separation device for holding a base portion to the retrievable telemetry package, a first member being attachable to the base portion, and a second member being attached to a separating portion accommodating the telemetry package;

each of the portions having complementary lugs that overlap each other, each of the overlapping lugs having a bore aligning with a bore in antoher lug;

a pin mounted in one of the bores and extending into the bore of an adjacent interfitting lug, the pin being movable in the other bore a sufficient distance to move to a position completely out of the one bore, thereby removing any connection between the two lugs; and a pyrotechnic device capable of generating a propelling gas positioned in the one bore on an end of the pin opposite from the other bore, the pyrotechnic device including means for detonating the pyrotechnic device with a remote signal, so that upon actuation the pin will be propelled to move the sufficient distance.

9. The apparatus of claim 8 wherein the one bore has one closed end at the end of the bore opposite from the other bore.

10. The apparatus as specified in claim 9 wherein the other bore has two different diameters, a bore portion having a first diameter receiving a major part of the pin and being adjacent the one bore, and a smaller diameter bore portion extending through the lug having the other bore, the pin having a small diameter neck portion extending through the small diameter bore and a large diameter portion extending into the one bore and also into the large diameter portion of the other bore leaving the sufficient distance of the large diameter portion of the other bore unobstructed, whereby upon actuation of the pyrotechnic device, the pin will move the sufficient distance to a position where it is stopped against the surfaces defining the smaller bore.

11. The apparatus as specified in claim 9 wherein the other bore is a bore extending through its respective lug.

* * * * *

UNITED STATES PATENT AND TRADEMARK OFFICE
CERTIFICATE OF CORRECTION

PATENT NO. : 4,762,088

DATED : August 9, 1988

INVENTOR(S) : Richard C. Chapman et al.

It is certified that error appears in the above-identified patent and that said Letters Patent is hereby corrected as shown below:

Column 7, line 56, delete "potion" and insert --portion--.

Column 9, line 11, delete "antoher" and insert --another--.

Signed and Sealed this

Twenty-seventh Day of December, 1988

Attest:

DONALD J. QUIGG

*Attesting Officer*      *Commissioner of Patents and Trademarks*